B. LJUNGSTRÖM.
METHOD OF MANUFACTURING VANE RINGS FOR GAS OR STEAM TURBINES.
APPLICATION FILED FEB. 19, 1910.

1,042,358.

Patented Oct. 22, 1912.

WITNESSES
Henry H. Babcock
E. M. Babcock

INVENTOR
Birger Ljungström
by W. H. Babcock
Attorney

UNITED STATES PATENT OFFICE.

BIRGER LJUNGSTRÖM, OF STOCKHOLM, SWEDEN, ASSIGNOR TO AKTIEBOLAGET LJUNGSTROMS ANGTURBIN, OF STOCKHOLM, SWEDEN.

METHOD OF MANUFACTURING VANE-RINGS FOR GAS OR STEAM TURBINES.

1,042,358.

Specification of Letters Patent.   Patented Oct. 22, 1912.

Application filed February 19, 1910. Serial No. 544,871.

To all whom it may concern:

Be it known that I, BIRGER LJUNGSTRÖM, engineer, citizen of Sweden, residing at Grefmagnigatan 18, Stockholm, Sweden, have invented new and useful Improvements in Methods of Manufacturing Vane-Rings for Gas or Steam Turbines, of which the following is a specification.

My present invention relates to a method of manufacturing vane-rings for gas- or steam turbines, in which the vanes have both ends secured to connecting or stiffening rings.

My invention further relates to a device, which may suitably be used in manufacturing the vane-rings.

The invention consists in connecting or stiffening rings made from a single disk, which integral construction on account of the great stability of the whole system, will considerably facilitate the working of the vane-rings.

If the vane-ends be secured to the vane-rings by heat, for instance by soldering or welding, the outer annular part of the disk, wherein the vanes are to be secured, may suitably be separated from the other parts of the disk by an annular groove, leaving only a thin annular strip between the outer ring and the disk. By this construction the heat during the soldering or welding process is prevented from being transmitted to the whole disk. This will facilitate soldering or welding, will lessen the amount of heat required and will cause only the peripheral parts of the disk to be heated, thereby preventing stresses and strains in the disks.

Figure 1:
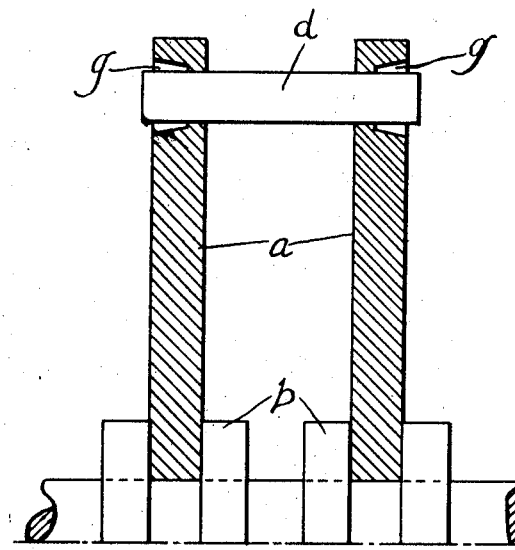
Figure 2:
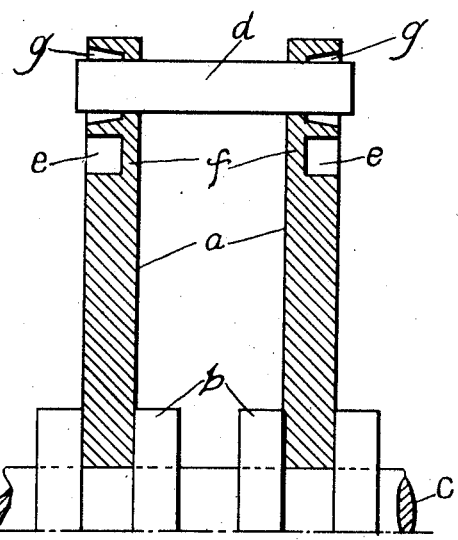
Figure 3:
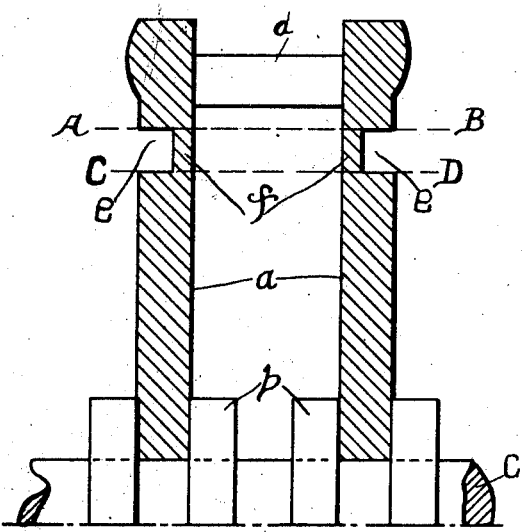
Figure 4:
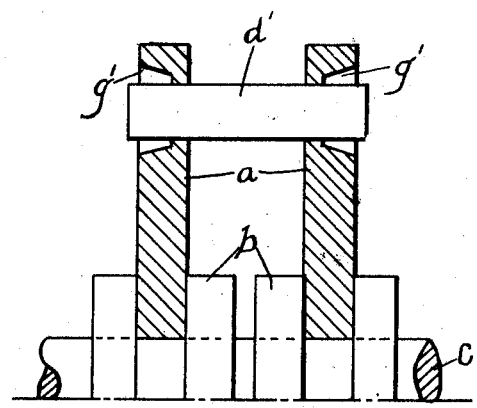

In the accompanying drawings: Figure 1 represents a vertical cross-sectional view of the upper half of a vane ring being manufactured according to my invention, after the first two steps in my method; Fig. 2, a similar view after the third step; Fig. 3, a similar view after the fourth step, the vane ring now being ready for the fifth step which consists in cutting away the walls $f$ on the lines A—C, C—D; and Fig. 4, a similar view after the first two steps of a repetition of the method on the same disks, the latter being of smaller diameter, by reason of the first vane ring having been cut away, and moved closer together.

$a$ designates two disks, which by means of the naves or hubs $b$ or in any other suitable manner are secured to the shaft $c$.

$d$ are the vanes.

When the rings are to be manufactured grooves $g$ are cut in the outer faces of the disks $a$ and near the outer edges thereof, the inner walls of said grooves $g$ being perforated to receive the ends of vanes $d$. The said vanes $d$ are inserted in the said perforations and secured therein in any known manner, preferably by soldering or welding. After the vanes have been secured to the disks and have been worked in any desired manner, the peripheral annular part of the disks is cut away together with the vanes by turning or cutting, for instance by making annular grooves $e$ on lines A—B C—D. When the securing of the vanes and rings is performed by heat—soldering or welding—the said grooves $e$ are cut before the welding or soldering process begins; thereby, however, a thin strip $f$ is left, which is to be cut away, when the soldering or welding process is finished and the whole vane-ring is to be separated from the disks. When the vanes have been inserted in and secured to the rings, the strip $f$ is cut away, new annular grooves $g'$ having their vertical walls perforated are cut in the outer faces of the remaining parts of disks $a$ near the outer edges thereof and new vanes $d'$ are inserted in said perforations and the process just described is repeated.

It is sometimes necessary to diminish the distance between the disks $a$ when the diameter of the remaining disks is diminished, as the vanes are often shorter in smaller vane-rings. This is provided for by means of the nave $b$ consisting of two parts laterally movable in relation to each other. In the said parts the disks $a$ are inserted and by this means the said disks can be moved toward each other and secured in a new relative position to each other.

It is clear that the vane-rings before being separated from the disks can be worked in any desired manner, so that they are completely finished before being cut away from the disks. They may thereby be given the shape indicated in dotted lines on the drawing, whereby they can easily be secured to the turbine-disks or to thicker stiffening rings. Of course the disks may be provided with all the grooves e before they are subjected to further treatment.

I claim:

1. The method of manufacturing vane-rings for turbines consisting in inserting the vanes in a body, securing them to the said body and thereinafter cutting away the part of the body, wherein the vanes had been inserted, from the other parts of the said body.

2. The method of manufacturing vane-rings for turbines consisting in inserting the vanes in a body, cutting a groove in the said body, said groove separating the vane-carrying part of the body from the other part thereof and only leaving a thin strip between these parts, then securing the vanes to the body by means of heat and cutting away the said thin strip.

3. The method of manufacturing vane-rings for turbines consisting in inserting the vanes in a body, the vane-carrying part thereof being separated from the other parts by means of a thin strip, then welding the vanes to the vane-carrying part and cutting away the thin strip.

4. The method of manufacturing vane-rings for turbines consisting in inserting the vanes in a disk, securing them to the said disk and thereinafter cutting away the vane-carrying part of the disk.

5. The method of manufacturing vane-rings for turbines consisting in inserting the vanes in a disk, the vane-carrying part thereof being joined to the other parts by means of a thin strip, welding the vanes to the vane-carrying part and cutting away the thin strip.

6. The method of manufacturing vane-rings for turbines consisting in inserting the ends of the vanes in the outer periphery of two circular disks, the vane-carrying annular parts thereof being joined to the other parts by means of thin annular strips, welding the vanes to the vane-carrying rings and separating the rings from the disks by cutting away the annular strips.

7. The method of manufacturing vane-rings for turbines consisting in inserting the ends of the vanes in the outer periphery of two circular disks, making a groove in the disks, said groove separating the vane-carrying parts thereof from the other parts of the disks and leaving only a thin strip between said parts, welding the vanes to the vane-carrying rings and cutting away the strips.

8. The method of manufacturing vane-rings for turbines consisting in inserting the ends of the vanes in the outer peripheries of two circular disks, separating the vane-carrying parts of the disks from the other parts thereof, adjusting the disks in relation to each other, inserting the ends of other vanes in the remaining parts of the disks, welding the vanes to the vane-carrying rings and separating the vane carrying parts of the disks from the other parts thereof.

In testimony whereof I have signed my name to this specification in the presence of two subscribing witnesses.

BIRGER LJUNGSTRÖM.

Witnesses:
 HEDWIG MELINDER,
 HARRY ARBILEN.